United States Patent
Poetscher

(10) Patent No.: US 12,500,627 B2
(45) Date of Patent: Dec. 16, 2025

(54) NFC LOOP ANTENNA IN THE VICINITY OF A METALLIC STRUCTURE, AND METHOD FOR OPERATING THIS ANTENNA

(71) Applicant: STMicroelectronics Austria GmbH, Graz (AT)

(72) Inventor: Thomas Poetscher, Deutschfeistritz (AT)

(73) Assignee: STMicroelectronics Austria GmbH, Graz (AT)

( * ) Notice: Subject to any disclaimer, the term of this patent is extended or adjusted under 35 U.S.C. 154(b) by 173 days.

(21) Appl. No.: 18/314,667

(22) Filed: May 9, 2023

(65) Prior Publication Data

US 2023/0370117 A1    Nov. 16, 2023

(30) Foreign Application Priority Data

May 10, 2022    (EP) ..................................... 22172483
Sep. 27, 2022    (EP) ..................................... 22197935

(51) Int. Cl.
*H04B 5/77* (2024.01)
*H01Q 7/00* (2006.01)
*H04B 5/26* (2024.01)
*H04B 5/45* (2024.01)

(52) U.S. Cl.
CPC ................. *H04B 5/77* (2024.01); *H01Q 7/00* (2013.01); *H04B 5/263* (2024.01); *H04B 5/266* (2024.01); *H04B 5/45* (2024.01)

(58) Field of Classification Search
CPC .......... H01Q 7/00; H04B 5/263; H04B 5/266; H04B 5/45; H04B 5/72; H04B 5/77
See application file for complete search history.

(56) References Cited

U.S. PATENT DOCUMENTS

| | | | |
|---|---|---|---|
| 9,608,327 B1 * | 3/2017 | Tai ........................... | H01Q 7/06 |
| 9,947,991 B2 * | 4/2018 | Murayama ............... | H01Q 7/06 |
| 10,997,483 B2 | 5/2021 | Rizzo | |
| 2012/0274521 A1 | 11/2012 | Minemura et al. | |
| 2012/0309531 A1 * | 12/2012 | Gong ................... | H03K 17/955 |
| | | | 463/36 |
| 2013/0162594 A1 * | 6/2013 | Paulsen .................... | H01Q 1/22 |
| | | | 345/173 |
| 2014/0002313 A1 * | 1/2014 | Yang ....................... | H04W 4/80 |
| | | | 343/702 |
| 2014/0009348 A1 * | 1/2014 | Behin .................. | H01Q 1/2216 |
| | | | 343/788 |

(Continued)

FOREIGN PATENT DOCUMENTS

JP    2007208813 A    8/2007

*Primary Examiner* — Thien M Le
(74) *Attorney, Agent, or Firm* — Slater Matsil LLP

(57) ABSTRACT

In an embodiment a device includes an electrically conductive structure, a near field communication (NFC) reader including a support supporting an electrically conductive NFC loop antenna system located in a vicinity of the electrically conductive structure and a component configured to excite the loop antenna system with a current, wherein the loop antenna system has a geometry configured to generate several electromagnetic fields in response to excitation by the current, the electromagnetic fields having a NFC carrier frequency and respective different field directions adapted to induce respective eddy currents cancelling each other in the electrically conductive structure.

23 Claims, 8 Drawing Sheets

(56) References Cited

U.S. PATENT DOCUMENTS

| | | | |
|---|---|---|---|
| 2015/0072615 A1* | 3/2015 | Mofidi | H04B 1/525 |
| | | | 455/193.1 |
| 2016/0079671 A1* | 3/2016 | Yamaguchi | H01Q 1/22 |
| | | | 343/788 |
| 2017/0019783 A1* | 1/2017 | Van Bosch | H04W 4/80 |
| 2017/0214132 A1* | 7/2017 | Jeon | G06Q 20/3278 |
| 2017/0237149 A1* | 8/2017 | Lee | G06F 1/1626 |
| | | | 361/679.21 |
| 2019/0074585 A1* | 3/2019 | Vavelin | H01Q 1/52 |

\* cited by examiner

NFC LOOP ANTENNA IN THE VICINITY OF A METALLIC STRUCTURE, AND METHOD FOR OPERATING THIS ANTENNA

CROSS-REFERENCE TO RELATED APPLICATIONS

This application claims the benefit of European Patent Application No. 22197935.4, filed on Sep. 27, 2022 and also the benefit of European Patent Application No. 22172483.4, filed on May 10, 2022, both of which are hereby incorporated herein by reference.

TECHNICAL FIELD

The application relates to wireless communication between elements, for example between a reader and a transponder, in particular between a Near Field Communication (NFC) contactless reader and a tag, a contactless integrated circuit card or a mobile phone emulated in card mode, using typically a high frequency communication operating at 13.56 MHz. The application also relates more particularly to the NFC antennas of such elements located in the vicinity of metallic structures, as for example a reader, located in a console of a vehicle and surrounded by metal, and intended to communicate with a transponder placed on the console or with a mobile device/mobile phone.

BACKGROUND

Near Field Communication or NFC is a short range high frequency wireless communication technology which enables such exchange of data between two contactless devices over a short distance, for example 10 centimetres.

NFC is an open platform technology standardized in ISO/IEC 18092 and ISO/IEC 21481 but incorporates a variety of pre-existing standards including ISO/IEC 14443 protocol type A and type B.

NFC devices have the capability to support, in particular, a reader/writer mode which can be used to read and write NFC transponders or tags.

A transponder may be a passive one, i.e. performing load modulation of the magnetic field generated by the reader.

A transponder may be an active one.

When a transponder is an active one, i.e. using active load modulation (ALM) for transmitting information to the reader, the transponder generates the magnetic field which simulates load modulation of the reading device field performed by a passive transponder.

ALM needs to be used in case signal generated by passive load modulation is not strong enough to be detected by a reader. This is the case when transponder's antenna is small or located in a challenging environment.

NFC transmission is based on the physics phenomenon of electromagnetic inductive coupling. The reader and the tag are equipped with antenna coils and whenever electrons flow through the wires, they generate magnetic field and induce current in the coil.

If the NFC antenna and its magnetic field are close to a conductive material like a metal piece, a circular flow of electrons known as an eddy current will begin to move through the metal like swirling water in a stream.

When a metallic structure is located between the NFC reader and receiver antenna system, the eddy current flowing on the metal surface of said chassis will turn and generate its own magnetic field, which will interact with the coil and the communication will be negatively affected.

In other words, those eddy currents will cause losses preventing the reader to generate a sufficiently strong magnetic field to read out a card or even power the card.

For example, when the antenna of the reader is surrounded with a metallic structure, problems may occur when reading small tags placed in the outer perimeter of the antenna.

A known solution is to shield the NFC reader's antenna by using ferrite.

But, adding Ferrite causes higher costs and precision during assembly of the reader Another known solution is to introduce a cut into the metal to prevent the eddy currents from flowing in cycles round the antenna.

But an additional cut in the metal can cause mechanical instabilities or manufacturing effort as the cut must be glued with nonconductive material.

SUMMARY

Embodiments of the invention can be used either with passive or active transponders.

Further embodiments provide improved performance of a NFC reader in close proximity to an electrically conductive without causing higher costs and precision during assembly of the reader or causing mechanical instabilities or manufacturing effort without necessitating any additional.

Various embodiments provide a totally different solution for improving the performance of a NFC reader in close proximity to an electrically conductive structure. Such a new solution requires in particular neither additional materials nor cut in the electrically structure.

According to an embodiment, a device comprises
an electrically conductive structure, for example a metal plate or a metal housing,
a Near Field Communication-NFC-reader including a support, for example an electrically insulating support as a resin with eventually fiberglass, supporting an electrically conductive NFC loop antenna system located in the vicinity of the electrically conductive structure, and a component, for example a NFC controller coupled to an impedance matching circuit, configured to excite the loop antenna system with a current.

The antenna loop system has a geometry configured, in response to the excitation by said current, to generate several electromagnetic fields having a NFC carrier frequency and respective different directions adapted to induce in the electrically conductive structure respective eddy currents cancelling each other.

According to an embodiment, the loop antenna system has a geometry configured to define a number of areas and to generate in each area, in response to the excitation by the current, an electromagnetic field having either a first field direction perpendicular to said area or a second field direction opposite to said first field direction, thereby inducing in the electrically conductive structure eddy currents flowing in different current directions so that they are cancelling each other.

The number of areas may be an odd number, for example 3. However in such a case, it will be much harder to estimate or calculate the size of each individual area.

Thus it is preferable and much simpler to have an even number of areas.

The even number may be equal to 2, but may be also greater than 2, for example equal to 4, or 6, or 8.

The loop antenna system is advantageously configured to define a loop antenna sub-system for each area.

Each loop antenna sub-system may comprise one or several turns.

The loop antenna system may comprise one or several loop antennas.

According to a possible embodiment, the loop antenna system may comprise one loop antenna having a track including looped segments in each area for defining said loop antenna sub-systems.

Each looped segment is for example configured to generate in two adjacent areas having a common edge, in response to the excitation by the current, two respective electromagnetic fields having the opposite first and second field directions thereby inducing in the two parts of the electrically conductive structure respectively located in the vicinity of the two adjacent areas, two respective eddy currents flowing in opposite current directions.

According to another possible embodiment, the loop antenna system may comprise several loop antennas, for example two loop antennas, each loop antenna having a track including looped segments in at least one area for defining the corresponding loop antenna sub-system.

Each loop antenna may have a track including looped segments in several areas, for example in two areas, for defining the corresponding loop antenna sub-systems.

Each looped segment of the corresponding loop antenna is advantageously configured to generate in two adjacent areas, in response to the excitation by the current, two respective electromagnetic fields having the opposite first and second field directions thereby inducing in the two parts of the electrically conductive structure respectively located in the vicinity of the two adjacent areas, two respective eddy currents flowing in opposite current directions.

The loop antenna system comprises several loop antennas having overlapping parts.

This permits to reduce or even eliminate eventual blind spots.

The electrically conductive structure may be located above or below or beside or around the loop antenna system.

The electrically conductive structure may comprise for example a metal shield surrounding the loop antenna system.

The electrically conductive structure may also comprise for example a metal housing having an aperture closed by the support supporting the loop antenna system.

According to another embodiment, a communication system is proposed comprising a device as defined above and a Near Field Communication-NFC-transponder including a support supporting an electrically conductive NFC loop antenna system intended to face the NFC loop antenna system of the NFC reader, the antenna loop system of the NFC transponder having the same geometry as the antenna loop system of the NFC reader.

The geometry of the antenna loop system of the NFC transponder may be configured, in response to an excitation by said several electromagnetic fields having a NFC carrier frequency and respective different field directions generated by the NFC reader, to draw a single common NFC operating current.

According to another embodiment, a Near Field Communication-NFC-reader is proposed including a support supporting an electrically NFC loop antenna system having the features defined above, and a component configured to excite the loop antenna system with a current.

According to another embodiment, a Near Field Communication-NFC-transponder is proposed, including a support supporting an antenna loop system having the features defined above.

According to another embodiment, a Near Field Communication-NFC-transponder is proposed, including a support supporting an antenna loop system having a geometry configured, in response to an excitation by several electromagnetic fields having a NFC carrier frequency and respective different field directions, to draw a single common NFC operating current.

According to another embodiment, an NFC antenna assembly is proposed, including a support supporting an electrically loop antenna system having the features defined above.

The NFC antenna assembly may belong to a NFC reader.

According to another embodiment, an NFC antenna assembly of a NFC transponder is proposed, including an electrically loop antenna system having a geometry analogous to the geometry of the electrically loop antenna system of the antenna assembly of the NFC reader defined above.

According to another embodiment, a method is proposed, comprising
exciting with a current an electrically conductive NFC loop antenna system located in the vicinity of an electrically conductive structure,
said antenna loop system generating, in response to the excitation by said current and due to its geometry, several electromagnetic fields having a NFC carrier frequency and respective different field directions inducing in the electrically conductive structure respective eddy currents cancelling each other.

The electrically NFC loop antenna system used in this method may have advantageously the features defined above.

According to another embodiment, a method comprises:
exciting with several electromagnetic fields having a NFC carrier frequency and respective different field directions, an electrically conductive NFC loop antenna system,
said antenna loop system drawing, in response to the excitation by said several electromagnetic fields and due to its geometry, a single common NFC operating current.

In other words, according to the features defined above, the antenna loop system has advantageously a geometry configured, in response to the excitation by a current, to generate several electromagnetic fields having a NFC carrier frequency and respective different field directions.

The loop antenna system may have a geometry configured to define a number, preferably an even number, of areas and to generate in each area, in response to the excitation by the current, an electromagnetic field having either a first field direction perpendicular to said area or a second field direction opposite to said first field direction.

The even number is greater than or equal to 2, for example equal to 4.

The loop antenna system may be configured to define a loop antenna sub-system for each area.

Each loop antenna sub-system may comprise one or several turns.

The loop antenna system may comprise one or several loop antennas.

For example, the loop antenna system comprises one loop antenna having a track including looped segments in each area for defining said loop antenna sub-systems.

In such an embodiment each looped segment may be configured to generate in two adjacent areas having a common edge, in response to the excitation by the current, two respective electromagnetic fields having the opposite first and second field directions.

The loop antenna system may also comprise several loop antennas, each loop antenna having a track including looped segments in at least one area for defining the corresponding loop antenna sub-system.

For example each loop antenna has a track including looped segments in several areas for defining the corresponding loop antenna sub-systems.

In such an embodiment, each looped segment of the corresponding loop antenna is configured to generate in two adjacent areas, in response to the excitation by the current, two respective electromagnetic fields having the opposite first and second field directions.

The loop antenna system may comprise several loop antennas having overlapping parts.

The loop antenna system may be operated either in a differential mode or in at least one single ended mode or sequentially in three different modes including a differential mode and two different single ended modes.

BRIEF DESCRIPTION OF THE DRAWINGS

Other advantages and features of the invention will appear in the detailed description below and in the appended drawings which are not limitative, in which.

DETAILED DESCRIPTION OF ILLUSTRATIVE EMBODIMENTS

Figure 1:
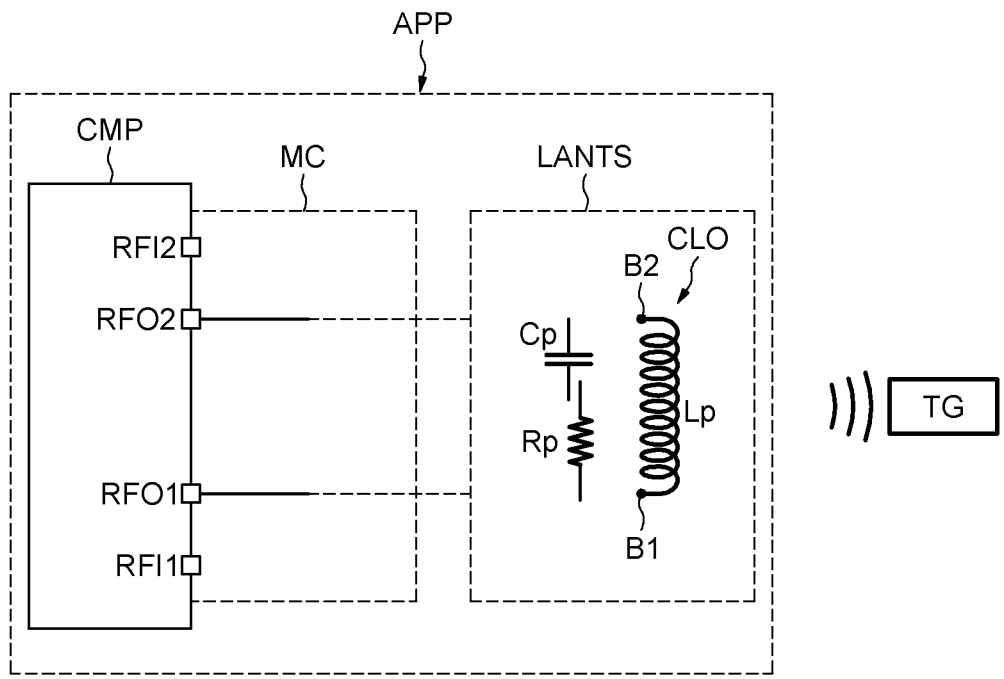
FIG. 1 shows an apparatus operating as a NFC reader.

On FIG. 1, reference APP designates a communication device operating as a NFC reader.

Alternatively the device may be a portable computer.

The apparatus APP comprises a wireless component CMP of the NFC type, for example a NFC microcontroller.

The microcontroller CMP includes terminals RFO1, RFO2 for transmitting information to a transponder TG and two other terminals RFI1, RFI2 usable for the reception of information from the transponder.

The reader APP is provided with a NFC loop antenna system ANT including at least one coil CLO having an inductance value Lp, a resistive value Rp_ant and a capacitance value Cp.

The, or each, coil CLO has two terminals B1 and B2 respectively coupled to terminals RFO2 and to terminals RFO1 through a conventional matching circuit MC including an EMI filter (EMI: ElectroMagnetic Interference).

In this FIG. 1, the representation of the loop antenna system ANT is very diagrammatic and simplified. More precision on the design/geometry of the loop antenna system ANT will be given thereafter.

Further, for simplification reasons, connection of the matching circuit MC to the terminals RFI1 and RFI2 are not illustrated.

The resistive, capacitive and inductive values of the different components of the antenna system ANT and the matching circuit MC are chosen so that the antenna system ANT forms a resonance circuit having a resonance frequency equal to a NFC carrier frequency, typically 13.56 MHz.

Thus, when the antenna system ANT is excited by a current provided by the component CMP and having a frequency equal to said NFC carrier frequency (for example 13.56 MHz), it induces an electromagnetic field at the resonant antenna ANT.

And when the antenna system is located in the vicinity of an electrically conductive structure, the NFC antenna system ANT, which is excited by a current having a NFC carrier frequency, generates the electromagnetic field inducing eddy currents in this electrically conductive structure.

Figure 2:
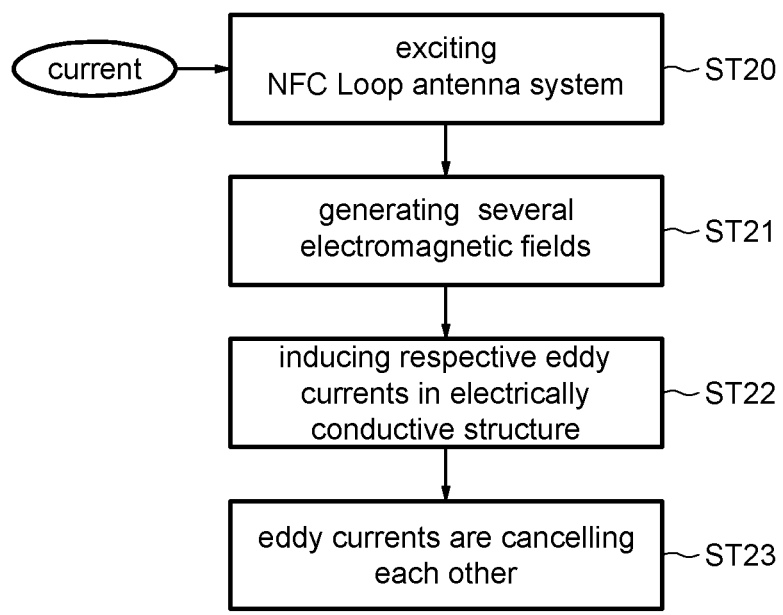
FIG. 2 shows a method for generating eddy current that are cancelling each other.

And generally speaking, as diagrammatically in FIG. 2, when the loop antenna system is excited by the current having a frequency equal to said NFC carrier frequency (step ST20), the loop antenna system ANT generates (step ST21), due to its geometry, several electromagnetic fields having the same power, a NFC carrier frequency but respective different directions.

Those electromagnetic fields induce (step ST22) in the electrically conductive structure respective eddy currents cancelling each other (step ST23).

Thus those eddy currents will reduce or even not cause losses preventing the reader to generate a sufficiently strong magnetic field to read out the transponder.

The loop antenna system LANTS has a geometry configured to define an even number of areas and to generate in each area, in response to the excitation by the current, an electromagnetic field having either a first field direction perpendicular to said area or a second field direction opposite to said first field direction, thereby inducing in the electrically conductive structure eddy currents flowing in different current directions so that they are cancelling each other.

The loop antenna system is configured to define a loop antenna sub-system for each area.

Each loop antenna sub-system comprises one or several turns.

And the loop antenna system may comprise one or several loop antennas.

Figure 3:
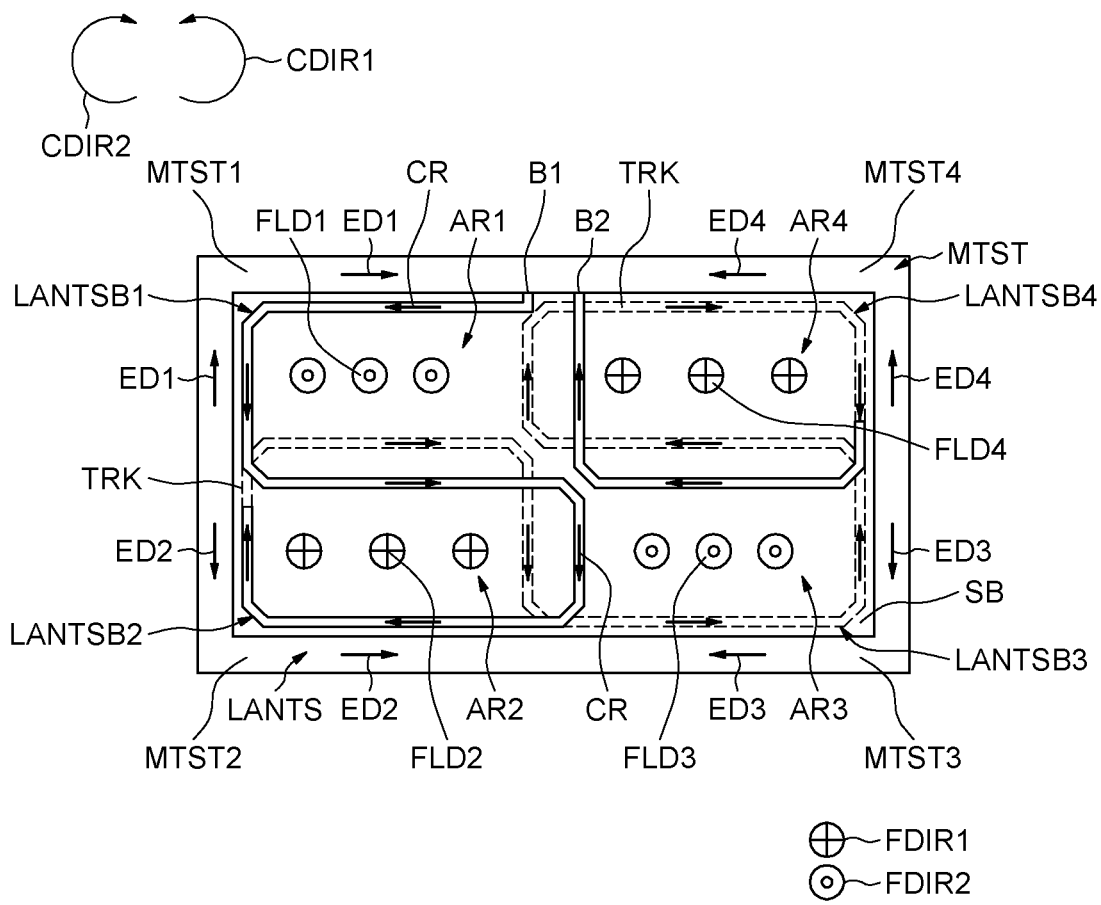
FIG. 3 shows a loop antenna system according to embodiments.

We refer now more particularly to FIG. 3 which illustrates diagrammatically a first embodiment of the loop antenna system LANTS.

In this embodiment, the loop antenna system comprises one loop antenna supported by an electrically insulating support or substrate SB and surrounded by a metal plate or shield MTST forming the electrically conductive structure.

The loop antenna has a metal track TRK, for example in copper, snaking along the support SB here on two metal levels, for defining here four areas AR1, AR2, AR3, AR4.

For example the part of the track TRK in full line is on the metal level 2 while the part of the track TRK in dotted line is in metal level 1. Conventional vias permit to make the link between part on metal level 1 and part on metal level 2.

The metal track includes looped segments in each area for defining a loop antenna sub-system LANTSB1-LANTSB4 for each area ARi.

Each loop segment has one turn.

The two ends of the metal track TRK form the two terminals B1 and B2 of the loop antenna.

Here the areas AR1 and AR2 have a common edge (horizontal in FIG. 3).

The areas AR3 and AR4 have a common edge (horizontal in FIG. 3).

The areas AR1 and AR4 have a common edge (vertical in FIG. 3).

The areas AR2 and AR3 have a common edge (vertical in FIG. 3).

The areas AR1 and AR4 have no common edge.

When the loop antenna is excited by the current CR, the current CR runs through the metal track from terminal B1 to terminal B2 according to the illustrated arrows.

And each looped segment is configured to generate in two adjacent areas having a common edge, in response to the excitation by the current CR, two respective electromagnetic fields having the opposite first and second field directions FDIR1, FDIR2.

More precisely, in area AR1, the generated electromagnetic field FLD1 has the second field direction FDIR2.

In area AR2, the generated electromagnetic field FLD2 has the first field direction FDIR1.

In area AR3, the generated electromagnetic field FLD3 has the second field direction FDIR2.

In area AR4, the generated electromagnetic field FLD4 has the first field direction FDIR1.

The generated electromagnetic field FLD1 induces in the part MTST1 of the metal plate MTST adjacent to the area AR1 an eddy current ED1 flowing in the second current direction CDIR2.

The generated electromagnetic field FLD2 induces in the part MTST2 of the metal plate MTST adjacent to the area AR2 an eddy current ED2 flowing in the first current direction CDIR1, opposite to the second current direction CDIR2.

The generated electromagnetic field FLD3 induces in the part MTST3 of the metal plate MTST adjacent to the area AR3 an eddy current ED3 flowing in the second current direction CDIR2.

The generated electromagnetic field FLD4 induces in the part MTST4 of the metal plate MTST adjacent to the area AR4 an eddy current ED1 flowing in the first current direction CDIR1.

Those eddy currents EDi are cancelling each other.

Note that in the part MTSTi of the metal plate, adjacent to the area ARi, there is an outside electromagnetic field having a field direction opposite to the field direction of the field FLDi generated within this area ARi.

And the sum of all the outside electromagnetic fields is null or approximatively null.

Figure 4:
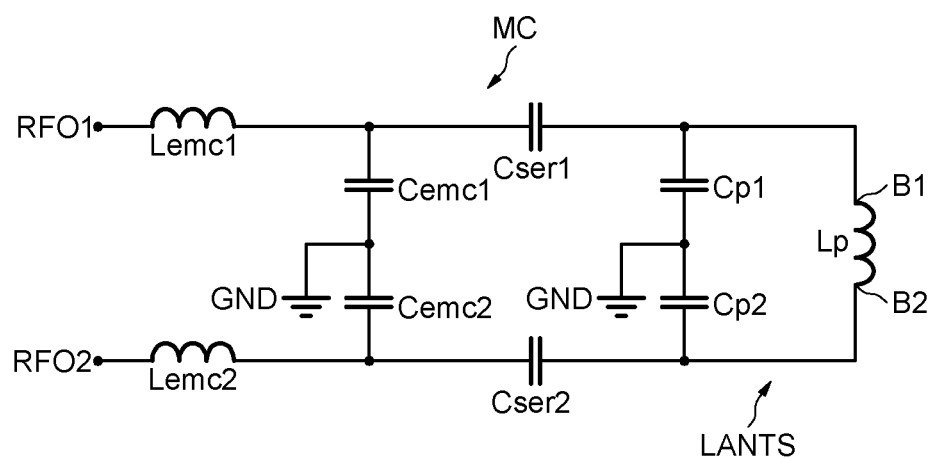
FIG. 4 shows a loop antenna system according to specific embodiments.
Figure 5:
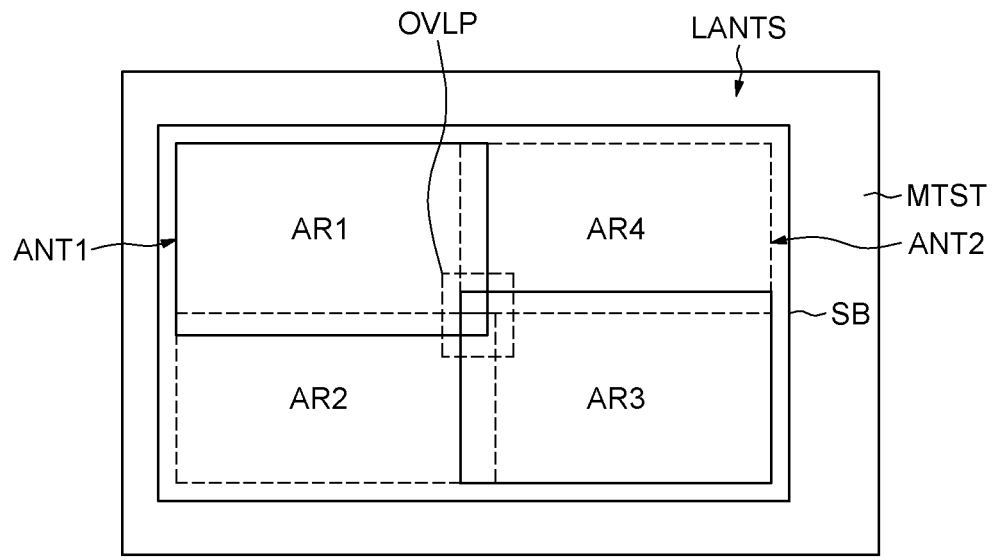
FIG. 5 shows a loop antenna system according to other specific embodiments.

As illustrated in FIG. 4, the loop antenna system LANTS of FIG. 3, is used with a differential architecture.

More precisely, the matching circuit MC comprises an inductive element Lemc1 connected in series with a capacitor Cser1 between terminal RFO1 and terminal B1 of the antenna, and an inductive element Lemc2 connected in series with a capacitor Cser2 between terminal RFO2 and terminal B2 of the antenna.

The matching circuit comprises also two other capacitors Cemc1 and Cemc2 connected in series between the common node of Lemc1 and Cser1 and the common node of Lemc2 and Cser2.

The common node of Cemc1 and Cemc2 is connected to ground GND.

The two capacitors Cp1 and Cp2 connected in series between the two antenna terminals B1 and B2, and having a common node connected to ground GND, represent the capacitive value of the antenna.

We refer now more particularly to FIGS. 5 to 8 which illustrate diagrammatically a second embodiment of the loop antenna system LANTS.

In this embodiment, the loop antenna system LANTS comprises (FIG. 5) two loop antennas ANT1 (in full line), ANT2 (in dotted line) supported by the electrically insulating support or substrate SB and surrounded by a metal plate or shield MTST forming the electrically conductive structure.

The two antennas ANT1, ANT2 have overlapping parts, which permits to reduce or even eliminate blind spots.

The two antennas define again four areas AR1-AR4.

Figure 6:
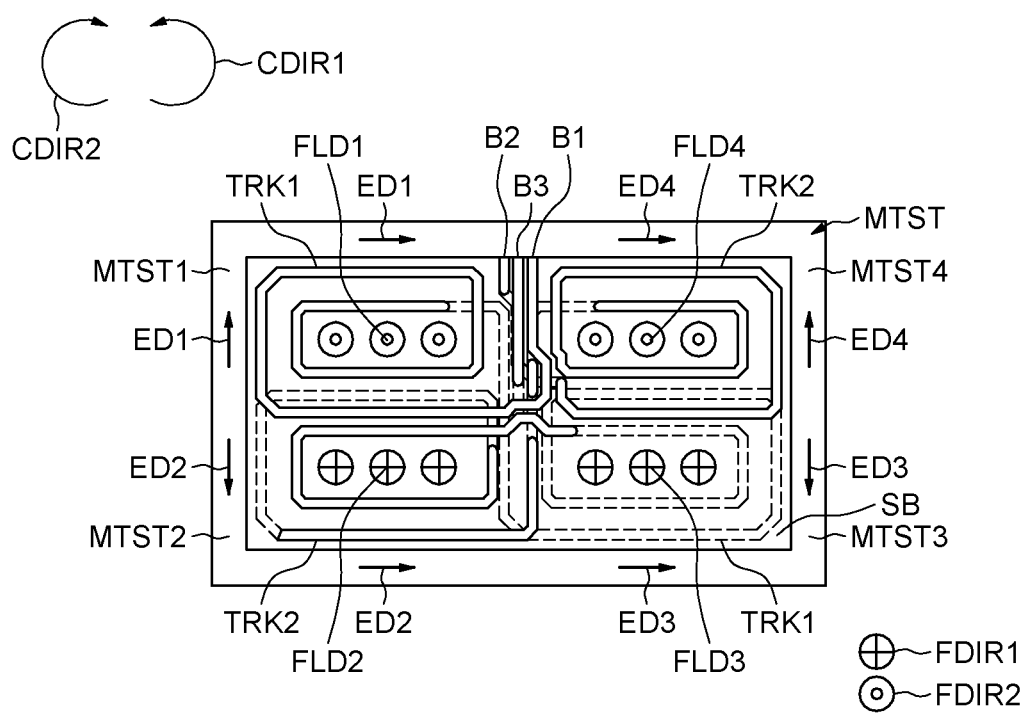
FIG. 6 shows a loop antenna system according to further embodiments.

As illustrated in FIG. 6, antenna ANT1 has a metal track TRK1 and antenna ANT2 has a metal track TRK2.

Each track TRK1, TRK2, for example in copper, snakes along the support SB here on two metal levels, for defining here the four areas AR1, AR2, AR3, AR4.

For example in FIG. 6, the parts of the tracks TRK1, TRK2 in full line are on the metal level 2 while the parts of the tracks TRK1, TRK2 in dotted line is in metal level 1. Conventional vias permit to make the link between parts on metal level 1 and parts on metal level 2.

Figure 7:
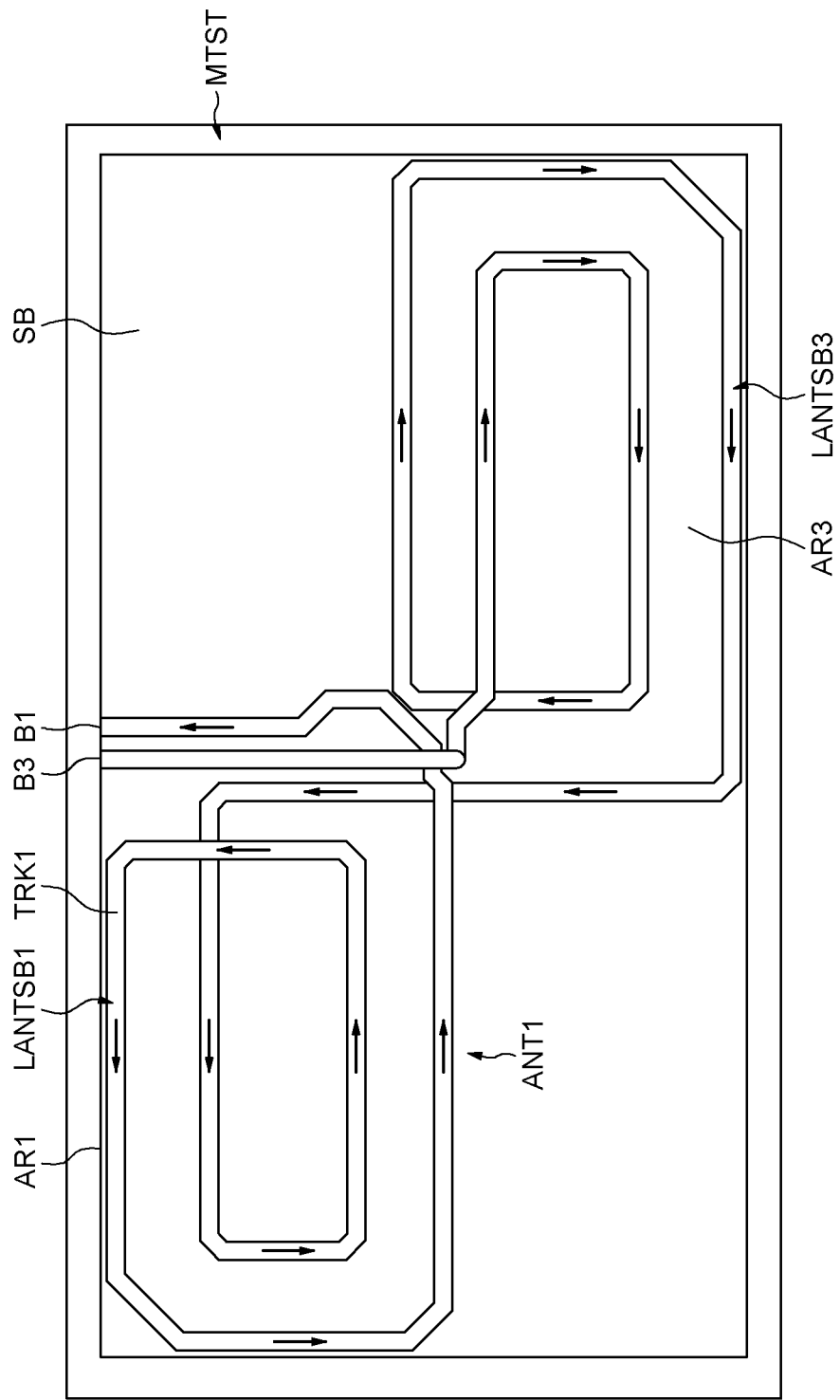
FIG. 7 shows metal tracks according to embodiments.
Figure 8:
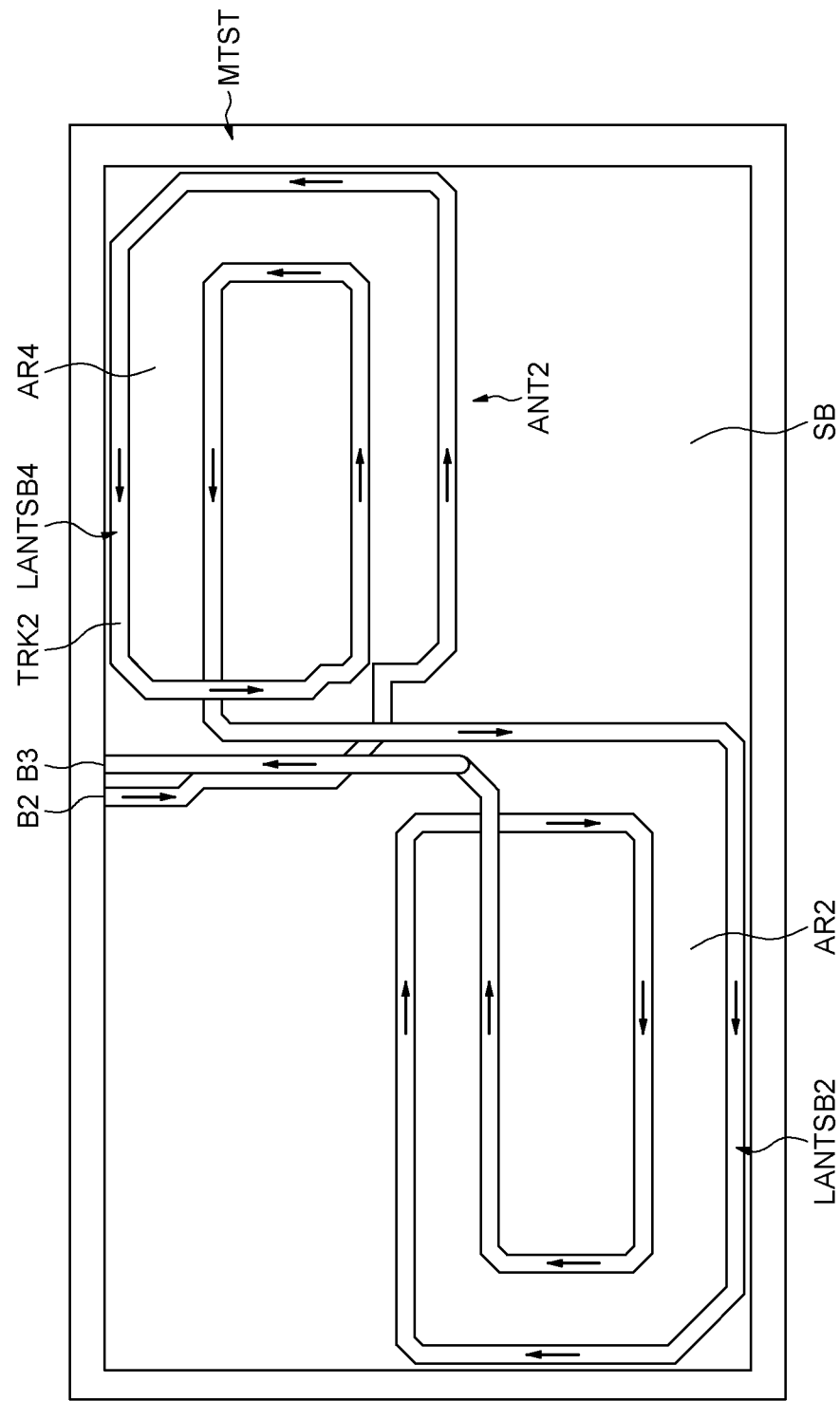
FIG. 8 shows metal tracks according to other embodiments.

FIG. 7 illustrates the drawing of metal track TRK1 of antenna ANT1 and FIG. 8 illustrates the drawing of metal track TRK2 of antenna ANT2.

The metal track TRK1 includes looped segments in areas AR1 and AR3 for defining a loop antenna sub-system LANTSB1-LANTSB3 for areas AR1 and AR3.

Each loop segment has two turns.

Area AR1 and area AR3 are adjacent areas for loop antenna ANT1.

The two ends of the metal track TRK1 form the two terminals B1 and B3 of the loop antenna ANT1.

The metal track TRK2 includes looped segments in areas AR2 and AR4 for defining a loop antenna sub-system LANTSB2-LANTSB4 for areas AR2 and AR4.

Each loop segment has two turns.

Area AR2 and area AR4 are adjacent areas for loop antenna ANT1.

The two ends of the metal track TRK2 form the two terminals B2 and B3 of the loop antenna ANT1.

Terminal B3 is common to antennas ANT1 and ANT2.

In FIGS. 6 to 8, the arrows on the tracks TRK1 and TRK2 illustrate the current flowing in the antennas when the antennas are excited by this current.

Each looped segment of the corresponding loop antenna is configured to generate in two adjacent areas, in response to the excitation by the current, two respective electromagnetic fields having the opposite first and second field directions thereby inducing in the two parts of the electrically conductive structure respectively located in the vicinity of the two adjacent areas, two respective eddy currents flowing in opposite current directions.

More precisely, each looped segment of antenna ANT1 is configured to generate in the two adjacent areas AR1 and AR2, in response to the excitation by the current, two respective electromagnetic fields FLD1, FLD2 having the opposite second and first field directions FDIR2, FDIR1, thereby inducing in the two parts MTST1, MTST3 of the electrically conductive structure respectively located in the vicinity of the two adjacent areas AR1, AR3, two respective eddy currents ED1, ED3 flowing in opposite current directions CDIR2, CDIR1.

Each looped segment of antenna ANT2 is configured to generate in the two adjacent areas AR2 and AR4, in response to the excitation by the current, two respective electromagnetic fields FLD2, FLD4 having the opposite first and second field directions FDIR1, FDIR2, thereby inducing in the two parts MTST2, MTST4 of the electrically conductive structure respectively located in the vicinity of the two adjacent areas AR2, AR4, two respective eddy currents ED2, ED4 flowing in opposite current directions CDIR1, CDIR2.

Those eddy currents EDi are cancelling each other.

Note that in the part MTSTi of the metal plate, adjacent to the area AR1, there is an outside electromagnetic field having a field direction opposite to the field direction of the field FLDi generated within this area AR1.

And the sum of all the outside electromagnetic fields is null or approximatively null.

Figure 9:
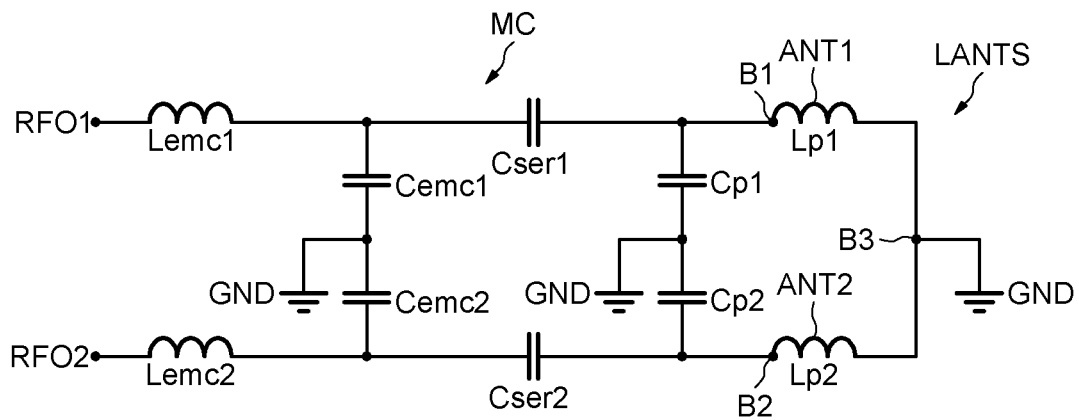
FIGS. 9-11 shows a loop antenna system to other embodiments.

As illustrated in FIG. 9, the loop antenna system LANTS of FIG. 3, is used with a differential architecture.

More precisely, the matching circuit MC, identical to the one disclosed with reference to FIG. 4, is connected to terminal B1 of antenna ANT1 and to terminal B2 of antenna ANT2.

The common terminal B3 of both antennas ANT1 and ANT2 is connected to ground GND.

Figure 10:
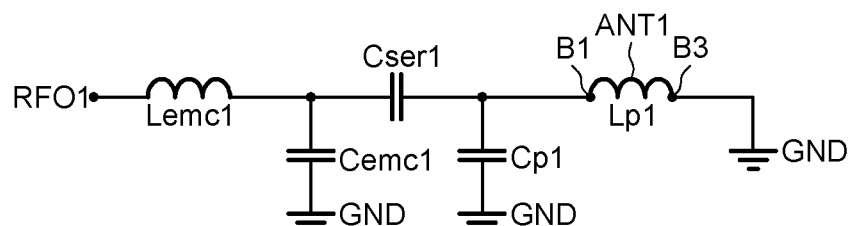

As illustrated in FIG. 10, the loop antenna system LANTS of FIG. 3, may be also used with a single ended architecture using antenna ANT1.

More precisely, in such a case, only the terminal RFO1 of the microcontroller CMP cooperates (for example activates, operates, drives, . . . ) with terminal B1 of antenna ANT1 through the corresponding first part Lemc1, Cemc1, Cser1 of the matching circuit, and terminal B3 antenna ANT1 is connected to ground GND.

Terminal RFO2 is inactive.

Figure 11:
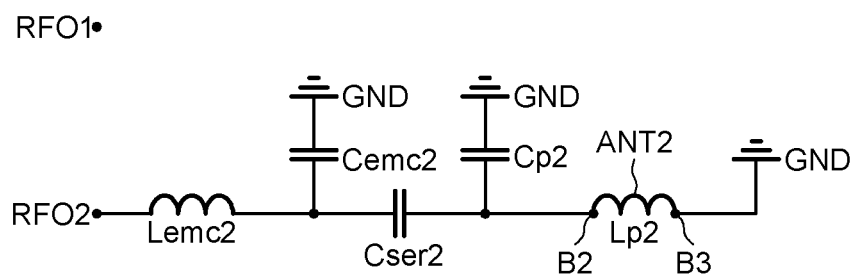

As illustrated in FIG. 11, the loop antenna system LANTS of FIG. 3, may be also used with a single ended architecture using antenna ANT2.

More precisely, in such a case, only the terminal RFO2 of the microcontroller CMP cooperates with terminal B2 of antenna ANT2 through the corresponding second part Lemc2, Cemc2, Cser2 of the matching circuit, and terminal B3 antenna ANT2 is connected to ground GND.

Terminal RFO1 is inactive.

Making the terminal RFO1/RFO2 active or inactive, for using the differential architecture or one of the two possible single ended architecture, can be implemented for example by using switches connected to those terminals and controlled by the microcontroller CMP.

It is also possible that the component CMP may have this "switching" function built in. In such a case, in a single ended architecture or mode, only one terminal RFOi is driven and the other RFO terminal remains at either a power voltage or ground.

Those three possible architectures or modes (differential, single ended with RFO1, single ended with RFO2) may be operated sequentially in order to increase the coverage of the generated electromagnetic field, with a reduction or even an omission of the blind spots in the differential architecture.

Figure 12:
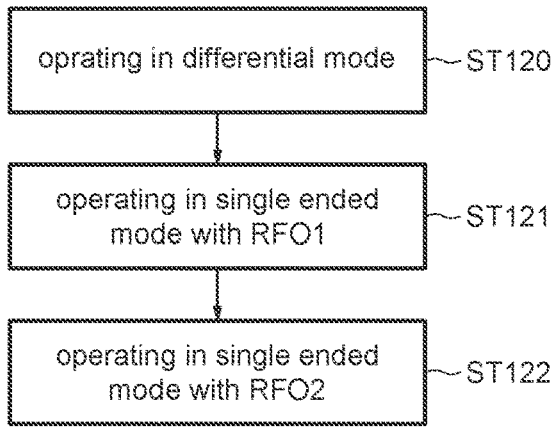
FIG. 12 shows different modes of operation according to embodiments.

An example of such a sequential order is illustrated in FIG. 12.

In step S120, the differential mode is operated.

In step S121, the single ended mode with RFO1 is then operated.

In step S122, the single ended mode with RFO2 is then operated.

Of course this order may be changed.

Figure 13:
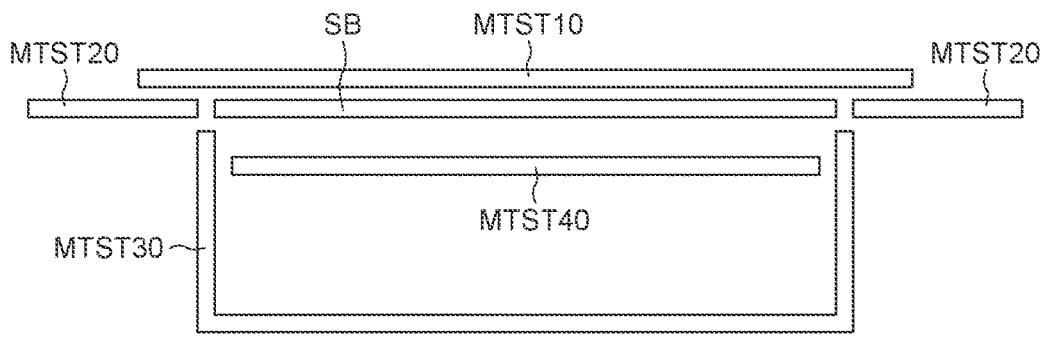
FIG. 13 shows an electrically conductive structure according to embodiments.
Figure 14:
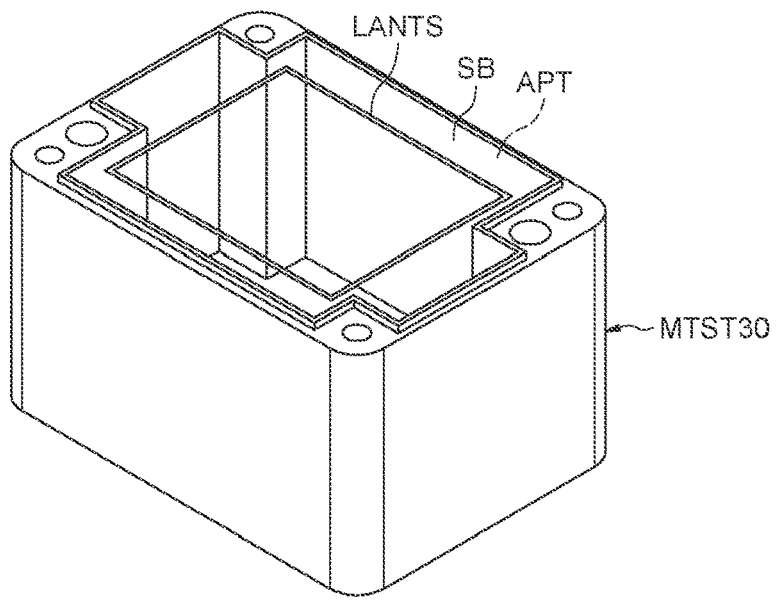
FIG. 14 shows a component according to embodiments.

As illustrated diagrammatically in FIG. 13, the electrically conductive structure, may be a metal plate MTST10 located above the substrate SB of the loop antenna system, and/or a metal plate MTST20 located around the substrate and/or a metal plate MTST40 located under the substrate and/or a metal housing MTST30 having an aperture APT closed by the substrate as illustrated more particularly in FIG. 14.

In FIG. 14, the component CMP of the reader may be located within or outside the housing MTST30.

Figure 15:
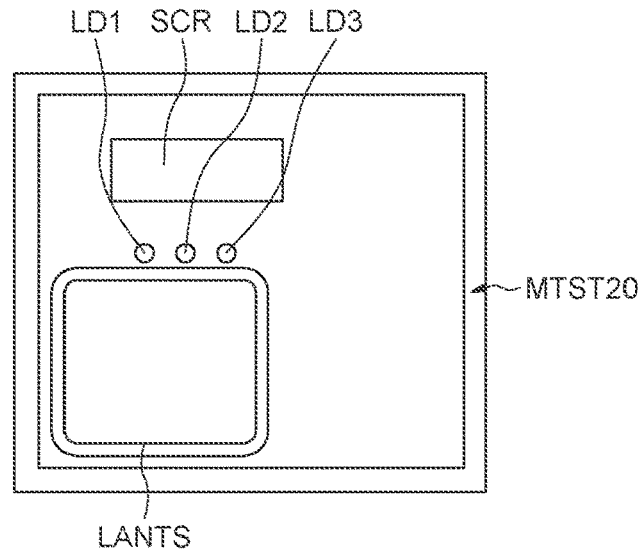
FIG. 15 shows a metal plate according to embodiments.

As illustrated in FIG. 15, the metal plate MTST20 may form a metal shield which can include also a screen SCR and LEDS LD1-LD3.

In resume, embodiments are provided with an antenna loop system having a geometry configured, in response to the excitation by a current, to generate several electromagnetic fields having a NFC carrier frequency and respective different field directions adapted to induce in the electrically conductive structure respective eddy currents cancelling each other, which permits in particular to reduce or even not cause losses preventing the reader to generate a sufficiently strong magnetic field to read out the transponder TG (FIG. 1).

We turn now to the operation of the Near Field Communication-NFC— transponder TG in a wireless communication with the NFC reader using such embodiments of the antenna assembly.

In a first case, the overall size of the NFC loop antenna system of the NFC transponder TG is much smaller than the size of the NFC loop antenna system LANTS of the NFC reader APP. For example, the size of the NFC loop antenna system of the NFC transponder TG is smaller or about the size of a single area AR1-AR4 amongst said number of areas AR1-AR4.

In this first case, it is assumed that the transponder's NFC loop antenna system, when facing the NFC loop antenna system LANTS of the NFC reader APP, faces only one area AR1-AR4 at a time (at least in most circumstances).

Thus, while the sum of all the outside electromagnetic fields is null or approximatively null, the transponder's NFC loop antenna system is exposed to a local electromagnetic field having either the first field direction FDIR1 or the second field direction FDIR2, not compensating each other.

In consequence, in this first case the NFC transponder TG can include a conventional loop antenna. For example, the conventional loop antenna may comprise a single loop segment having at least one turn, typically several turns in a spiral route.

In a second case, the overall size of the NFC transponder TG and its NFC loop antenna system is about the same size as the NFC loop antenna system LANTS of the NFC reader APP.

In this second case, one may consider that the transponder's NFC loop antenna system, when facing the NFC loop antenna system LANTS of the NFC reader APP, may face several amongst the number of areas AR1-AR4 in the same time.

Thus, the transponder's NFC loop antenna system may be exposed to at least two electromagnetic fields cancelling each other, respectively having the first field direction FDIR1 and the second field direction FDIR2.

Figure 16:
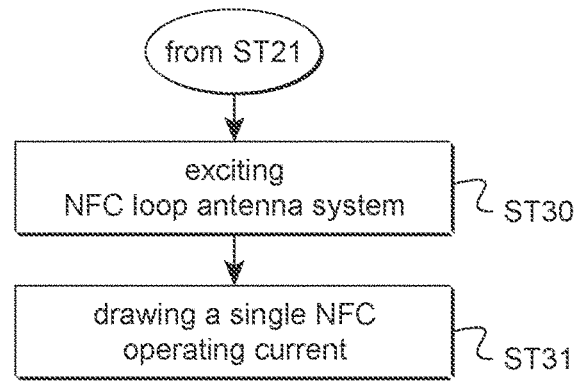
FIG. 16 shows an NFC transponder including an electrically conductive NFC loop antenna system according to an embodiment.

In consequence, as diagrammatically depicted by FIG. 16, in this second case, the NFC transponder TG advantageously includes an electrically conductive NFC loop antenna system TG_LANTS, which, when excited (step ST30) by several electromagnetic fields having a NFC carrier frequency and respective different field directions (from step ST21—FIG. 2), the antenna loop system TG_LANTS draws, i.e. generates, due to its geometry, a single common NFC operating current (step ST31).

Figure 17:
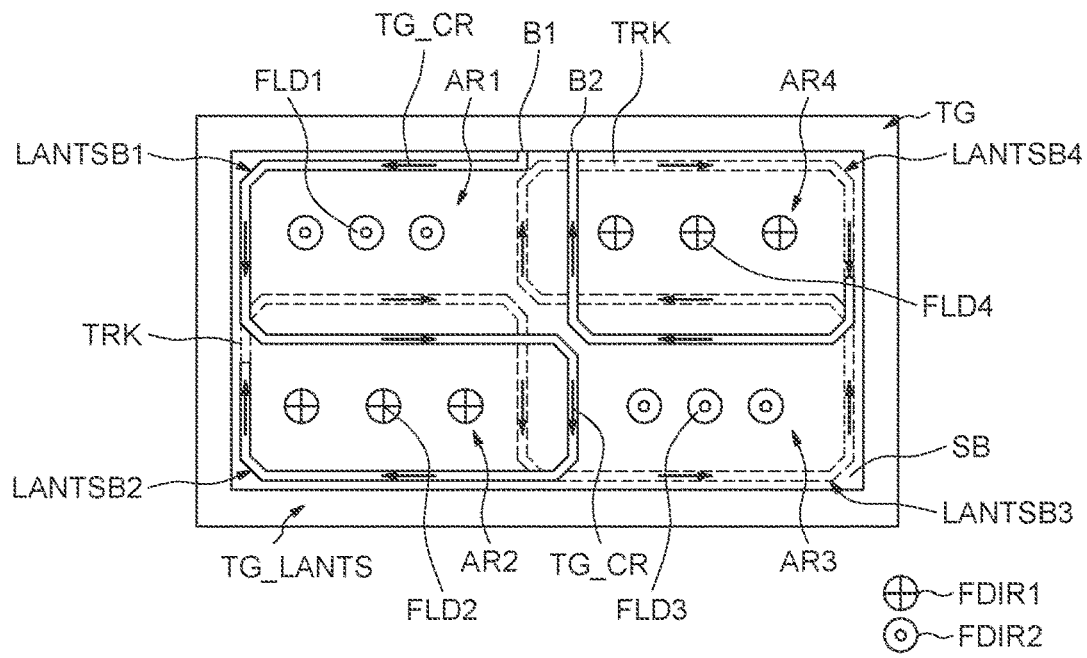
FIG. 17 diagrammatically illustrates an embodiment of the NFC loop antenna system.

FIG. 17 diagrammatically illustrates an embodiment of said advantageous NFC loop antenna system TG_LANTS for the NFC transponder TG, adapted to implement the steps ST30, ST31 depicted by FIG. 16.

In practice, this antenna loop system TG_LANTS of the NFC transponder TG is advantageously provided with the same geometry as the geometry of loop system LANTS of the NFC reader APP it intends to face for performing a near field communication NFC.

Accordingly, in this example embodiment, the antenna loop system TG_LANTS of the NFC transponder TG has the same geometry as the first embodiment, disclosed with reference to FIG. 3, of the antenna loop system LANTS of the NFC reader APP.

The same references are used as in FIG. 3 for the same subjects-matters, and the structural descriptions of these common subjects-matters provided in relation with FIG. 3 apply for FIG. 17.

In an alternative embodiment, the NFC loop antenna system TG_LANTS of the NFC transponder TG can have the same geometry as the second embodiment, disclosed with reference to FIGS. 5-8, of the antenna loop system LANTS of the NFC reader APP.

Thus, when the NFC transponder TG faces the NFC reader APP, the transponder's antenna loop system TG_LANTS is exposed to said several electromagnetic fields FLD1-FLD4 having respective different field directions FDIR1, FDIR2.

Since the geometry of the transponder's antenna loop system TG_LANTS corresponds to the geometry of the reader's antenna loop system LANTS, the respective electromagnetic fields FLD1-FLD4 are each locally exciting a respective area AR1-AR4 of the transponder's antenna loop system TG_LANTS.

The respective opposed field directions FDIR1, FDIR2 are thus each inducing, by electromagnetic coupling, a current flowing in the respective direction, for example the clockwise direction for the first field direction FDIR1 and the anti-clockwise direction for the second field direction FDIR2.

Thanks to the geometry of the transponder's antenna loop system TG_LANTS, the respectively induced currents are all drawn in the same direction of the antenna system, which results a single common NFC operating current drawn, and flowing for example from terminal B1 to terminal B2.

That being said, if the transponder TG is flip-reversed or rotated by 90 degrees (in this example), the resulting single common NFC operating current TG_CR flows in the opposite direction but works identically.

The NFC operating current TG_CR has a frequency equal to said NFC carrier frequency, and can serve to supply the transponder TG, and for instance to back-modulate the electromagnetic fields of the reader APP.

Thus, according to embodiments of the loop antenna system TG_LANTS of the NFC transponder TG:

The loop antenna system TG_LANTS may be configured to define a loop antenna sub-system LANTSB1-LANTSB4 for each area AR1-AR4.

Each loop antenna sub-system LANTSB1-LANTSB4 may comprise one or several turns.

The loop antenna system TG_LANTS may comprise one or several loop antennas.

The loop antenna system TG_LANTS may comprise one loop antenna having a track TRK including looped segments in each area AR1-AR4 for defining said loop antenna sub-systems.

Each looped segment may be configured to draw said single common NFC operating current TG_CR in two adjacent areas having a common edge (for example areas AR3, AR4), in response to the excitation by two respective electromagnetic fields having the opposite first and second field directions (for example fields FLD3-FDIR2, FDL4-FDIR1).

In an alternative, for instance with respect to the second embodiments depicted by FIGS. 5-8:

The loop antenna system TG_LANTS may comprise several loop antennas ANT1, ANT2, each loop antenna having a track including looped segments in at least one area for defining the corresponding loop antenna sub-system.

Each loop antenna may have a track TRK1, TRK2 (FIGS. 6-8) including looped segments in several areas for defining the corresponding loop antenna sub-systems.

Each looped segment of the corresponding loop antenna may be configured to draw said single common NFC operating current TG_CR in two adjacent areas, in response to the excitation by two respective electromagnetic fields having the opposite first and second field directions.

The loop antenna system TG_LANTS may comprise several loop antennas ANT1, ANT2 having overlapping parts OVLP (FIGS. 6-8).

Said number of areas AR1-AR4 may be an even number greater than or equal to 2, for example equal to 4.

What is claimed is:

1. A device comprising:
   an electrically conductive structure;
   a near field communication (NFC) reader including a support supporting an electrically conductive NFC loop antenna system located in a vicinity of the electrically conductive structure; and
   a component configured to excite the loop antenna system with a current,
   wherein the loop antenna system has a geometry configured to generate several electromagnetic fields in response to excitation by the current, the electromagnetic fields having an NFC carrier frequency and respective different field directions adapted to induce respective eddy currents cancelling each other in the electrically conductive structure.

2. The device according to claim 1,
   wherein the geometry of the loop antenna system is configured to:
   define a number of areas, and
   generate, in each area, in response to the excitation by the current, an electromagnetic field having either a first field direction perpendicular to a respective area or a second field direction opposite to the first field direction thereby inducing the eddy currents flowing in different current directions in the electrically conductive structure so that they are cancelling each other.

3. The device according to claim 2, wherein the loop antenna system is configured to define a loop antenna sub-system for each area.

4. The device according to claim 3, wherein each loop antenna sub-system comprises one or several turns.

5. The device according to claim 4, wherein the loop antenna system comprises one or more loop antennas.

6. The device according to claim 5, wherein the loop antenna system comprises several loop antennas having overlapping parts.

7. The device according to claim 2, wherein the number is an even number greater than or equal to 2.

8. The device according to claim 7, wherein the even number is equal to 4.

9. The device according to claim 1, wherein the loop antenna system comprises one loop antenna having a track including looped segments in each area.

10. The device according to claim 9, wherein each looped segment is configured to generate, in response to the excitation by the current, in two adjacent areas having a common edge, two respective electromagnetic fields having opposite first and second field directions, thereby inducing in two parts of the electrically conductive structure respectively located in the vicinity of the two adjacent areas, two respective eddy currents flowing in opposite current directions.

11. The device according to claim 1, wherein the loop antenna system comprises several loop antennas, each loop antenna having a track including looped segments in at least one area.

12. The device according to claim 11, wherein the track includes looped segments in several areas.

13. The device according to claim 12, wherein each looped segment of a corresponding loop antenna is configured to generate, in response to the excitation by the current, in two adjacent areas two respective electromagnetic fields having opposite first and second field directions, thereby inducing in two parts of the electrically conductive structure respectively located in the vicinity of the two adjacent areas, two respective eddy currents flowing in opposite current directions.

14. The device according to claim 1, wherein the electrically conductive structure is located above or below the loop antenna system.

15. The device according to claim 14, wherein the electrically conductive structure comprises a metal shield surrounding the loop antenna system.

16. The device according to claim 14, wherein the electrically conductive structure comprises a metal housing having an aperture closed by the loop antenna system.

17. A communication system comprising:
the device according to claim 1; and
an NFC transponder including the support supporting the electrically conductive NFC loop antenna system facing the NFC loop antenna system of the NFC reader,
wherein the NFC loop antenna system of the NFC transponder has the same geometry as the NFC loop antenna system of the NFC reader.

18. The communication system according to claim 17, wherein the geometry of the NFC loop antenna system of the NFC transponder is configured, in response to an excitation by the several electromagnetic fields having the NFC carrier frequency and the respective different field directions generated by the NFC reader, to induce a single common NFC operating current.

19. A near field communication (NFC) reader comprising:
a support supporting an electrically conductive NFC loop antenna system; and
a component configured to excite the NFC loop antenna system with a current,
wherein the NFC loop antenna system has a geometry configured to generate several electromagnetic fields in response to an excitation by the current, the electromagnetic fields having an NFC carrier frequency and respective different field directions adapted to induce respective eddy currents cancelling each other in an electrically conductive structure.

20. A near field communication (NFC) transponder comprising:
a support supporting a loop antenna system having a geometry configured, in response to an excitation by several electromagnetic fields having a single NFC carrier frequency and respective different field directions, to induce a single common NFC operating current in the NFC transponder.

21. A method comprising:
exciting an electrically conductive near field communication (NFC) loop antenna system with a current, the NFC loop antenna system located in a vicinity of an electrically conductive structure; and
generating, by the NFC loop antenna system, in response to excitation by the current and due to its geometry, several electromagnetic fields having an NFC carrier frequency and respective different field directions thereby inducing respective eddy currents cancelling each other in the electrically conductive structure.

22. The method according to claim 21, wherein the NFC loop antenna system is operated either in a differential mode or in at least one single ended mode, or wherein the NFC loop antenna system is operated in three different modes including a differential mode and two different single ended modes.

23. A method comprising:
exciting with several electromagnetic fields having a single near-field communication (NFC) carrier frequency and respective different field directions an electrically conductive NFC loop antenna system; and
inducing, in response to the excitation by the several electromagnetic fields and due to its geometry, a single common NFC operating current in an NFC transponder.

* * * * *